US 8,243,887 B2

(12) United States Patent
Conahan

(10) Patent No.: US 8,243,887 B2
(45) Date of Patent: Aug. 14, 2012

(54) IDENTIFICATION OF NOTIFICATIONS IN A MASS NOTIFICATION SYSTEM

(75) Inventor: Natasha Conahan, San Diego, CA (US)

(73) Assignee: Blackboard Connect Inc., Washington, DC (US)

(*) Notice: Subject to any disclaimer, the term of this patent is extended or adjusted under 35 U.S.C. 154(b) by 678 days.

(21) Appl. No.: 12/405,083

(22) Filed: Mar. 16, 2009

(65) Prior Publication Data

US 2010/0232581 A1    Sep. 16, 2010

(51) Int. Cl.
*H04M 11/04* (2006.01)
(52) U.S. Cl. .............. 379/41; 379/88.27; 379/88.12
(58) Field of Classification Search ............. 379/67.1, 379/68, 41, 142.01, 142.04, 142.05, 88.27, 379/88.12
See application file for complete search history.

(56) References Cited

U.S. PATENT DOCUMENTS

| 5,568,540 | A  | * | 10/1996 | Greco et al. .............. 379/88.25 |
| 6,442,250 | B1 | * | 8/2002  | Troen-Krasnow et al. 379/93.15 |
| 6,950,502 | B1 | * | 9/2005  | Jenkins .................... 379/88.12 |
| 7,515,041 | B2 | * | 4/2009  | Eisold et al. ............... 340/506 |
| 7,660,397 | B2 | * | 2/2010  | Heen et al. .................. 379/40 |
| 7,685,245 | B1 | * | 3/2010  | Rodkey et al. .............. 709/206 |
| 2004/0103158 | A1 | * | 5/2004 | Vella et al. ................. 709/206 |
| 2008/0194236 | A1 | * | 8/2008 | Johns ...................... 455/412.2 |
| 2009/0060149 | A1 | * | 3/2009 | Pavelko et al. ............ 379/88.17 |
| 2009/0117926 | A1 | * | 5/2009 | Sterlino .................... 455/466 |

* cited by examiner

*Primary Examiner* — Olisa Anwah
(74) *Attorney, Agent, or Firm* — McDermott Will & Emery LLP

(57) ABSTRACT

A method for providing identification for voice notifications sent to notification recipients is disclosed. The method includes receiving, from a user, a request for transmitting at least one voice notification to a plurality of notification recipients, and receiving at least one identifier related to the at least one voice notification. The method also includes associating the voice notification with the identifier, and transmitting the voice notification and the identifier. In certain instances, the method further includes transmitting an alert containing the identifier before the voice notification is transmitted. A system for providing identification for voice notifications sent to notification recipients is also provided.

41 Claims, 4 Drawing Sheets

IDENTIFICATION OF NOTIFICATIONS IN A MASS NOTIFICATION SYSTEM

BACKGROUND

1. Field

The present disclosure relates to transmission of notifications, and more particularly, to methods and systems for identifying notifications in a notification system.

2. Background

Businesses and governmental entities, including federal and state officials, their agencies, municipalities and schools, are ever more reliant on communicating through the mass transmission of notifications to their staff, citizens and the family members of students to keep these constituencies apprized of important events, and sometimes of emergencies. For example, a school principal might need to send a message to the parent of every child that the school will be closed the next day due to some unforeseen event such as flooding, fire, or freezing conditions. Notifications with such messages might be sent by telephones, facsimiles, pagers, electronic mail (e-mail), and/or text messages. These notifications will typically vary in their degree of importance, in the number of recipients, in the duration of each message, and in the immediacy with which they must be sent.

However, there currently exists a growing problem as mass notification transmission systems become more prevalent. In particular, the notifications are not distinguishable from other network traffic received by the distributors (e.g., telecommunication providers) that maintain the network which delivers the notifications. Consequently, a notification in the interest of public safety intended for distribution to a large number of recipients, such as a telephone call from a government official, would appear the same as a telephone call or group of telephone calls from a telemarketer.

In such situations, delivery of some or all of the notifications may be blocked or delayed by the distributor because the distributor believes the notifications are inconsequential (e.g., a telemarketing telephone call), especially when the distributor's network is experiencing a significant traffic burden. It would be desirable to provide a system and method that allows a distributor to distinguish notifications from other network traffic.

SUMMARY

There is a need for a mass notification system that provides insight into the type and priority level of message content and distinguishes notifications from other network traffic. Embodiments of the disclosed systems and methods address this and other needs.

The present disclosure describes systems and methods whereby mass notifications can be identified by a distributor so that the distributor can make more informed decisions regarding the delivery of the notifications. For example, a notification may identify the notification originator so that originators and distributors can work together to better manage network traffic.

In certain aspects of the disclosure, a method for providing identification for voice notifications sent to notification recipients is provided. The method includes receiving, from a user, a request for transmitting at least one voice notification to a plurality of notification recipients, and receiving at least one identifier related to the voice notification. The method also includes associating the voice notification with the identifier, and transmitting the voice notification and the identifier.

In another aspect of the disclosure, a system for providing identification for voice notifications sent to notification recipients is provided. The system includes a request module configured to receive, from a user, a request for transmitting at least one voice notification to a plurality of notification recipients, and an identification module configured to receive at least one identifier related to the voice notification. The system also includes an associations module configured to associate the voice notification with the identifier, and a transmission module configured to transmit, from a notification provider, the voice notification and the identifier.

In a further aspect of the disclosure, a system for providing identification for voice notifications sent to notification recipients is provided. The system includes a request module configured to receive, from a user, a request for transmitting at least one voice notification to a plurality of notification recipients, and an identification module configured to receive at least one identifier related to the voice notification. The system also includes an associations module configured to associate the voice notification with the identifier, and a transmission module configured to transmit, from a notification provider, the voice notification with the identifier.

In yet a further aspect of the disclosure, a system for providing identification for voice notifications sent to notification recipients is provided. The system includes a request module configured to receive, from a user, a request for transmitting at least one voice notification to a plurality of notification recipients, and an identification module configured to receive at least one identifier configured to identify the voice notification. The system also includes an associations module configured to associate the voice notification with an alert comprising the identifier, and a transmission module configured to separately transmit the alert and the voice notification, wherein the alert is configured to be transmitted before the voice notification.

In yet a further aspect of the disclosure, a machine-readable medium encoded with instructions for providing identification for voice notifications sent to notification recipients is provided. The instructions include code for receiving, from a user, a request for transmitting at least one voice notification to a plurality of notification recipients, and receiving at least one identifier related to the voice notification. The instructions also include code for associating the voice notification with the identifier, and transmitting the voice notification and the identifier.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

There is a problem of distributors being unable to distinguish mass notifications from other incoming network traffic, or differentiate traffic relative to such things as content, importance, and/or timeliness. Further, distributors, sometimes faced with potential network overload, are unable to determine who to contact to alleviate immediate or future network congestion. This and other problems are addressed and solved, at least in part, by embodiments of the present disclosure which include a system for providing identification for voice notifications that traverse a network (e.g., the Public Switch Telephone Network) to intended notification recipients. The system includes a request module configured to receive, from a user (e.g., an approved message initiator), a request for transmitting at least one voice notification to a plurality of notification recipients, and an identification module configured to receive at least one identifier related to the voice notification. The system also includes an associations module configured to associate the voice notification with the identifier, and a transmission module configured to transmit, from a notification provider, the voice notification and the identifier. Consequently, the system provides for the ability to alert a distributor of a mass notification event in process and a means by which associated messages can be identified.

With reference to the drawings, which are provided by way of exemplification and not limitation, there are disclosed embodiments for disseminating a mass of outgoing digital notifications to an individual and/or a selected group, or groups, of recipients by way of various communication methods. More specifically, the provision of identification information for mass notifications is disclosed. As discussed and used interchangeably herein, an identifier and/or identification information includes any information capable of narrowing down the possible identity of an approved person or entity initiating the notification and/or the reason code, approval code, severity code, etc. from a larger set of possible identities and/or purposes. For example, an identifier or identification information includes, without limitation, a name, sender, job, batch, number, location, address, occupation, employer, associated entity, certification or authentication (e.g., "approved by the Federal Emergency Management Agency (FEMA)"), priority code, character, string, or value. A distributor as discussed herein is any entity responsible for maintaining the network (e.g., a public switched telephone network (PSTN), or time division multiplex (TDM) network such as a T1 or T3 transport network) that distributes and/or delivers a notification, such as, without limitation, a telecommunication provider, Internet services provider, or transmitting station.

Figure 1:
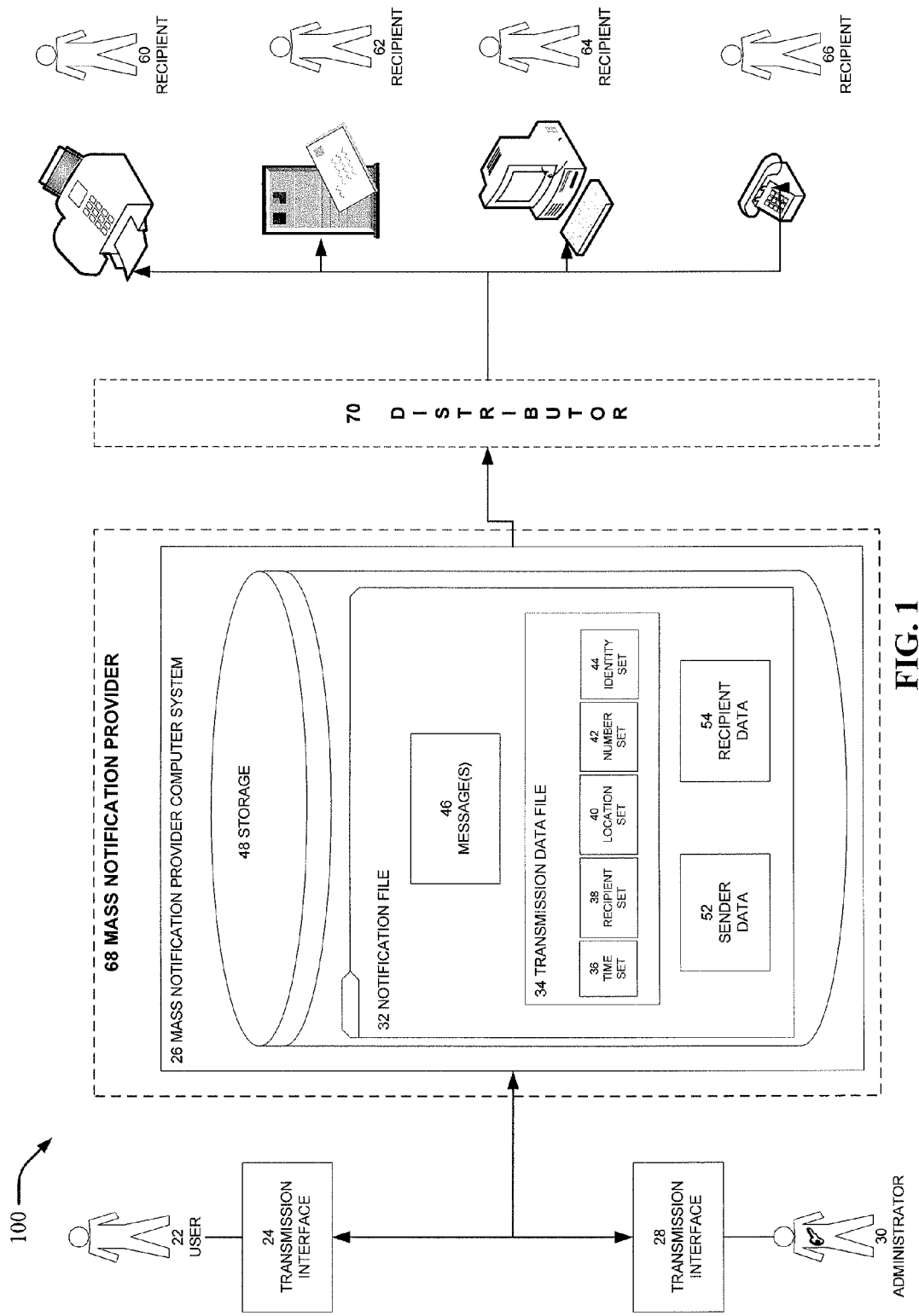
FIG. 1 is a diagram illustrating an example of a mass notification transmission system.

FIG. 1 is a diagram illustrating an example of a mass notification transmission system. As can be seen in FIG. 1, a central processing unit (CPU) or computer system 26 forms a core component of the system. The computer system 26 is preconfigured to receive a request for a notification 32 from a user (or "initiator") 22 who may wish to initiate the sending of a notification 32 that corresponds to the request to one, some, or a large number of recipients 60, 62, 64, and 66. In certain embodiments, the computer system 26 (hereinafter "mass notification provider computer system 26") is provided by the entity (e.g., mass notification provider 68) responsible for generating and providing notifications in response to the request for the notification from the user 22. In such embodiments, the user can initiate messages via a telephonic system and/or log into the computer system 26, such as over a network, e.g., the Internet. The user 22 will have normally acquired the right to send a notification 32 into the mass notification provider computer system 26 by earlier entering into a contract with the mass notification provider 68, entering his name on a list of legitimate users, paying the required fee if appropriate, receiving the proper training and/or certification, and acquiring an entry code. The notification 32 the user 22 sends to the mass notification provider computer system 26 may be sent in any one of a number of different formats via a transmission interface 24. It should be noted that a system administrator 30 (e.g., a user having greater access rights than user 22) may also send a notification 32 via a different transmission interface 28. For example, the transmission interface 24 and/or 28 may be an ordinary land telephone, a radio transmitter, a cell phone, a computer for sending email, a computer with an internet connection, or it may be a facsimile machine for sending faxes, or the like. In certain embodiments, an administrator 30 may be required to affix a special code to authenticate a notification 32.

Once the notification 32 is received by the mass notification provider computer system 26 from the user 22, it may be stored by the mass notification provider computer system 26 as a file in a local or remote memory associated with the mass notification provider computer system 26. The notification 32 may be associated with at least one user message 46 and a transmission data file 34 for later use. A notification 32 can include one or multiple messages 46 selected and/or created by the user 22. A message 46 included in a notification 32 might be, "Please avoid Main Street due to damage caused by recent severe weather."

If the notification 32 received is an ordinary voice notification 32 via an interface 24 which is a telephone, the analogue voice signal may be converted to a digital sound file such as a .wav file and stored by the mass notification provider computer system 26 as such. If the notification 32 received via the interface 24 is an email or text message (e.g., in short message service or multimedia message service format), it may be stored by the mass notification provider computer system 26 as, for example, a .txt or binary file, but it may also be converted to a sound file using text-to-speech (TTS) software. If the notification 32 is received as a facsimile, it may be stored by the mass notification provider computer system 26 as a .pdf file. Such file formats are exemplary only. The notification 32 may also be converted using a telecommunications device for the deaf (TDD) or teletypewriter (TTY) device. All of these notifications 32 are stored pending distribution to the appropriate recipients in the appropriate form.

Once the notification 32 is stored by the mass notification provider computer system 26, it is associated with the transmission data file 34 that is structured to include one or more of a number of data sets 36-44 that will later assist in controlling the transmission of the notification 32. For example, the user 22 may insert information into the data sets 36-44 by entering keystrokes (telephone key, computer key, etc.) in response to queries from the mass notification provider computer system 26 as to what information should be entered in the data sets 36-44. The data sets 36-44 will then be associated with the notification 32, as described.

The data sets 36-44 may comprise the following data sets. A time set 36 contains information relating to the time the notification 32 is scheduled for distribution. A recipient set 38 contains information relating to the class of recipients the notification 32 is intended to reach. For example, the recipients may be all the parents of students at a school between 6th and 8th grades. A location set 40 contains information relating to the geographical locations the notification 32 is intended to reach. For example, the intended recipients may be all the residents in a town living on one side of a river, or next to a combustible forest. Further data sets may be generated from information provided in preceding sets. For example, a number set 42 may be generated by the mass notification provider computer system 26 from the information entered into the recipient set 38, wherein the mass notification provider computer system 26 calculates the number of intended recipients of the notification 32, and enters that number into the number set 42 for later use. With particular relevance to the current disclosure, a sender identity set 44 may contain identifiers or identification information for the identity of the user 22 who created the notification 32, and/or identifiers or identification information for the identity of the mass notification provider 68 responsible for providing the notification 32 from the user 22 to a distributor 70 responsible for distributing the notification to a recipient, and information relating to the status and rights of that user 22 and/or that mass notification provider 68. In certain embodiments, the sender identity set 44 may include identifiers or identification information for the identity of other content of the notification 32.

As noted above, the notification 32 may be created in a plurality of formats (e.g., .wav, .txt, or .pdf). For example, the notification 32 may be created in at least one format, based on whether the notification 32 is received via interface 24 as a voice notification 32, a text message, an email, or a facsimile. Once the notification 32 is created in the appropriate plurality of formats (e.g., .wav, .txt, or .pdf) and is associated with the transmission data file 34 with its data sets, the mass notification provider computer system 26 stores the notification 32 and associated transmission data file 34 in an interface suitable for storage 48 until a triggering event occurs.

According to an embodiment of the disclosure, the notification 32 stored in storage unit 48 may further include sender data 52 and recipient data 54. To obtain information that may be needed by transmission data file 34, appropriate data may be accessed from storage unit 48. For example, in the context of school, storage unit 48 may be configured to include at least the following fields for each student: "Parent Name," "Student Name," "User 1," and "Message 1." As another example, if recipient set 38 identifies the recipients as all parents of students at a school between 6th and 8th grades, the parent contact information for all 6th through 8th grade students can be accessed from storage unit 48. It should be noted that the storing of notification file 32, which includes messages 46, transmission data file 34, sender data 52, and recipient data 54 is not limited to storage unit 48, and that this data may be stored elsewhere in mass notification provider computer system 26 or in other external systems.

Within the notification 32 in the mass notification provider computer system 26, each recipient of the notification 32 has already been associated with a form of transmission. This may be according to a prior request made by each potential recipient to the management of the system, or to a default form of transmission. In certain embodiments, this recipient association is stored in recipient data 54. Thus, for example, recipient 60 may have requested to be associated with a form of transmission by facsimile, recipient 62 may be associated with a form of transmission by voicemail, recipient 64 may be associated with a form of transmission by e-mail, recipient 66 may be associated with a means of transmission by telephone, text message, or pager, and so on. Thus, the mass notification provider computer system 26 is configured to transmit the notification 32 in appropriate format (e.g. .wav, .txt, .pdf) to each recipient, according to a known method. In certain embodiments, a means of transmission may be associated with the recipient based on a selection made by the user 22. For example, a user 22 may choose to associate a recipient with voicemail if the notification 32 is urgent. In certain embodiments, a means of transmission may be automatically associated with the recipient based on the content of the notification 32. For example, if the notification 32 includes an image, then means of transmission may be facsimile, cell broadcast, or email.

When a triggering event occurs, the mass notification provider computer system 26 causes one or many notifications 32 (having been delivered to the mass notification provider computer system 26 by an enabled user 22 possessing an appropriate access code) to be distributed, according to known methods, to one or a mass of recipients, e.g. recipients 60-66 of FIG. 1, identified by the user 22. In such instances, the notifications 32 may be provided by mass notification provider 68 to a distributor 70, such as a telecommunications company, responsible for the delivery of the notifications 32 to the intended recipients 60, 62, 64, and 66. Such notifications 32 may be combined with numerous similar notifications 32 (e.g., in a notification 32 batch) for mass transmission at approximately the same time. This capability of the system 100 places power in the hands of an approved official, institution, or group of people to keep classes of citizens informed of events that are directly relevant to them on a near real time basis.

Considering further aspects of the disclosed systems and methods, an exemplary problem that may be encountered will now be described. A notification 32, such as a telephone notification 32, regarding an important event sent by a government representative to a mass of recipients may be received by a distributor 70 at approximately the same time the distributor 70 receives a surge of other network traffic, thereby placing a large burden on the distributor's 70 distribution network. Since the notifications 32 in the prior art are indistinguishable from other network traffic that may not be time-sensitive in nature, such as telemarketing telephone calls, the distributor 70 may choose to delay or even cancel the delivery of the notifications 32 without consideration for the timeliness or importance of such notifications. The intended recipients of the notification may then remain uninformed of the event. This is an undesirable situation, especially if the notification 32 is regarding an event of particular significance to the recipients, such as a warning regarding a nearby public hazard. According to embodiments presently disclosed, in a mass notification transmission system 100 such as the one illustrated in FIG. 1, identification information is provided for notifications 32 so that a distributor 70 can more intelligently determine the priority with which the notifications 32 should be distributed to the intended recipients. Returning to the previous example, according to the present disclosure, the distributor 70 would be able to distinguish the notification 32 from other network traffic using the identification information and, therefore give priority to distribute the notification 32; thus, all of the recipients would receive the government official's warning notification 32 in a timely manner and would thereby become informed of the public hazard. Alternatively, the distributor 70 may chose to use relevant data associated with notification 32 to identify and contact the mass notification provider 68, system administrator 30 or user 22 to request further information about notification 32 and/or a different set of delivery algorithms to improve delivery throughput. An efficient method and system for identifying notifications 32 and data about those notifications in a mass notification system to provide proper distribution is thereby provided.

Figure 2:
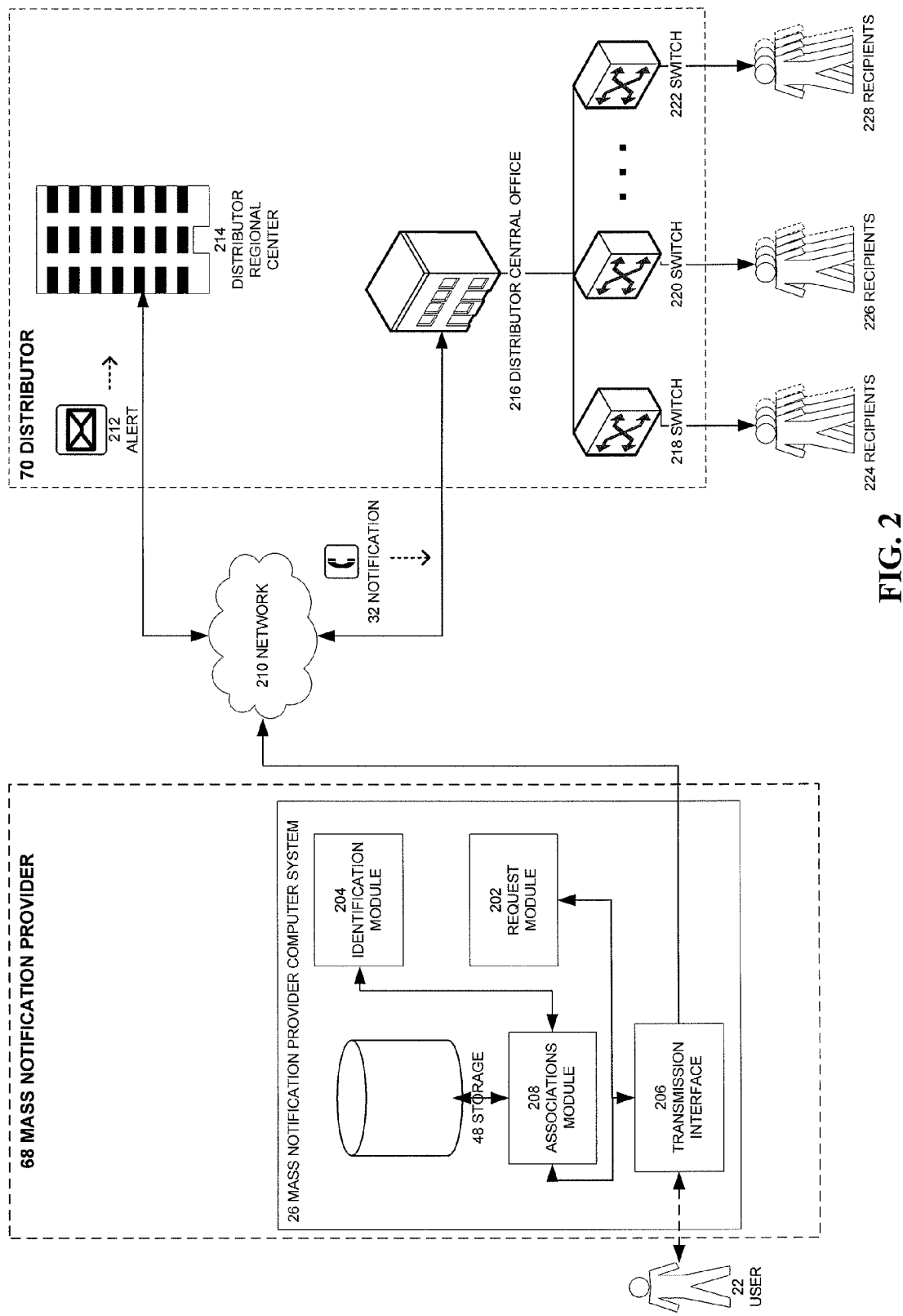
FIG. 2 is a diagram illustrating an embodiment of the mass notification provider computer system of FIG. 1 configured for providing identification for notifications.

FIG. 2 is a diagram illustrating an embodiment of the mass notification provider computer system 26 of FIG. 1 configured for providing identification for notifications 32.

As can be seen in FIG. 2, mass notification provider computer system 26 belonging to mass notification provider 68 includes a transmission interface 206, an associations module 208, a request module 202, an identification module 204, and storage 48. The mass notification provider computer system 26 is coupled to a network 210 for delivery of a notification 32 by distributor 70 to selected recipients 224, 226, and/or 228, and for optional delivery, to the distributor's regional center 214, of an alert 212 that is related to the notification 32.

The alert 212 can provide identification information for the notification 32. The alert 212 can be sent to the distributor 70, such as to a representative of the distributor 70 at a regional center 214 and/or other location responsible for controlling the traffic on the network 210 used to deliver the notification 32. For example, the alert 212 can be a text message, "I, the principal of Apple School District, have sent a notification in the interest of student safety to each parent or guardian of a student in my district. This corresponds to a priority code 2. All messages can be identified by the following methods <X, Y, and Z>. If you have any questions, please call me at 555-555-1212," created by the user 22 or, automatically, by mass notification provider 68 and sent to an individual representative, such as a manager, of the distributor 70 in the distributor's regional center 214. The manager may then decide how to prioritize the distribution of the user's notifications should network congestion be anticipated and/or encountered. In certain embodiments, the alert 212 is sent to the distributor 70 (e.g., to a representative of the distributor 70) before and/or simultaneous to the notification 32 being sent via the distributor 70 (e.g., for distribution by the distributor 70), so that the distributor 70 can distinguish the notification 32 from other traffic on the network 210 and make an informed decision about delivery of the notification 32 to the recipients 224, 226, and 228. The alert 212 can be formatted and/or distributed according to any format known to those of skill in the art, including, but not limited to, email, telephone, cellular telephone, text message, facsimile, or pager. The alert 212 can be sent to the distributor 70 using multiple means and multiple formats. For example, in order to ensure receipt of the alert 212, the alert 212 may be sent to a representative of the distributor via an email, landline telephone call, cellular telephone call, text message, or facsimile message to the representative of the distributor. The alert may also include a request for receipt and/or acknowledgement from the distributor 70 (e.g., the representative of the distributor 70).

The transmission interface 206 is similar to the transmission interface 24, and may be, for example, an ordinary land telephone, a radio transmitter, a cell phone, a computer for sending email, a computer with an internet connection, a modem, a data communications device, or it may be a facsimile machine for sending faxes, or the like. The transmission interface 206 is configured to transmit the notification 32, an identifier associated with the notification 32, and the alert 212 associated with the notification 32. For example, the transmission interface 206 can transmit, via a route from network 210 through a distributor's central office 216 and to the distributor's switches 218, 220, and 222, a notification 32 to multiple recipients 224, 226, and 228, each of whom are associated with the switches 218, 220, and 222, located at the distributor's central office 216. The transmission interface 206 can also transmit, in advance of the transmission of the notification 32, an alert 212 to the distributor's regional center 214. In certain embodiments, the alert 212 may be delivered to a different location than the notification 32. For example, the alert 212 may be distributed to a representative of the distributor 70 located at the distributor's regional center 214, while the notification 32 is distributed via switches 218, 220, and 222 located at the distributor's central office 216. The representative at the distributor's regional center 214 may then decide how to prioritize message distribution of the notification 32 to its intended recipients via switches 218, 200, and 222 at the distributor's central office 216. The representative at the distributor's regional center 214 may instead decide to contact the mass notification provider 68, system administrator 30, or user 22 to request further information about notification 32 and/or a different set of delivery algorithms to improve delivery throughput.

The request module 202 is configured to receive, from user 22, a request for transmitting one or many notifications 32 to one or many recipients 224, 226, and 228. The request may come in the form of the notification 32 itself, which designates its sender and intended recipients, among other information.

The identification module 204 is configured to receive or create one or multiple identifiers related to the notification 32 associated with the request received by the request module 202. The identifiers can be received from data storage 48, a selection made by the user 22, or another information source. The identifier can also be automatically generated by identification module 204 or other hardware or software based on an analysis of the notification 32 and/or the user 22. For example, if the user 22 indicates the notification 32 is a high priority (e.g., emergency) notification, an identifier indicating a high priority (e.g., passing a "Priority Code 1" to the distributor) can be associated with the notification 32. As another example, the identification module 204 can determine a size of the message 46 included in the notification 32, and associate an identifier indicating the size with the notification 32. As a further example, the identification module 204 can associate an identifier with a notification 32 based on reference information provided during the time the user 22 acquires a right to send notifications 32 using the system (e.g., during the user's account setup). The user 22 may at that time or at any other time provide contact information for the user 22 or for the distributor 70 responsible for delivering notifications 32 for the user.

As yet a further example, the identification module 204 can associate an identifier with a notification 32 based on an automatic identification of a distributor 70 responsible for delivering the notifications 32, such as by reference to a centralized database (e.g., the Telecordia® LERG™ routing guide). As another example, if an analysis of the notification 32 provides more information about the notification 32, such as a geographic origin of the notification 32 or the mass notification provider 68 responsible for providing the notification 32 to the distributor 70, then the identification module 204 can generate an identifier based on the geographic origin of the notification 32 or the mass notification provider 68.

The identifier is configured to be readable by a distributor 70, and can be formatted according to any format known to those of skill in the art, including, but not limited to, Automatic Number Identifier (ANI), Presubscribed Carrier Identifier (or Presubscribed Interexchange Carrier) (PIC) format, or a customized format configured to assist with identifying a notification.

The associations module 208 is configured to associate the notification 32 with at least one identifier, such as an identifier received from the identification module 204. For example, the notification 32 can be associated with identifiers that indicate the occupation and employer of the initiator, such as chief of the local police department, and a certification associated with the notification 32, such as an indicator that the notification 32 was approved by FEMA or other governmental regulatory authority for transmission and/or an indicator of the priority level assigned based upon predetermined governmental policy and/or practice.

In certain embodiments, the associations module 208 includes the identifiers with the notification 32, such as by including the identifiers in the sender data 52 portion of the notification 32, as discussed above. For example, if an alert 212 is not provided, then such a notification 32 including the identifiers will provide at least sufficient identification information for the distributor 70 to distinguish the notification 32 from other network traffic. In these cases, the distributor 70 may selectively choose to process the identification information, for example, such as when the distribution of notification 32 places a burden on the network (e.g., large number of recipients, large notification 32 size, etc.). In certain embodiments, the association module 208 includes certain identifiers with the alert 212 and does not include those identifiers with the notification 32, in order to reduce burden on the network 210 by reducing the amount of duplicate information (e.g., duplicate identifiers) transmitted on the network 210. Consequently, in such embodiments, the association module 208 may not include any identifiers with the notification 32, instead including them with the alert 212.

Figure 3:
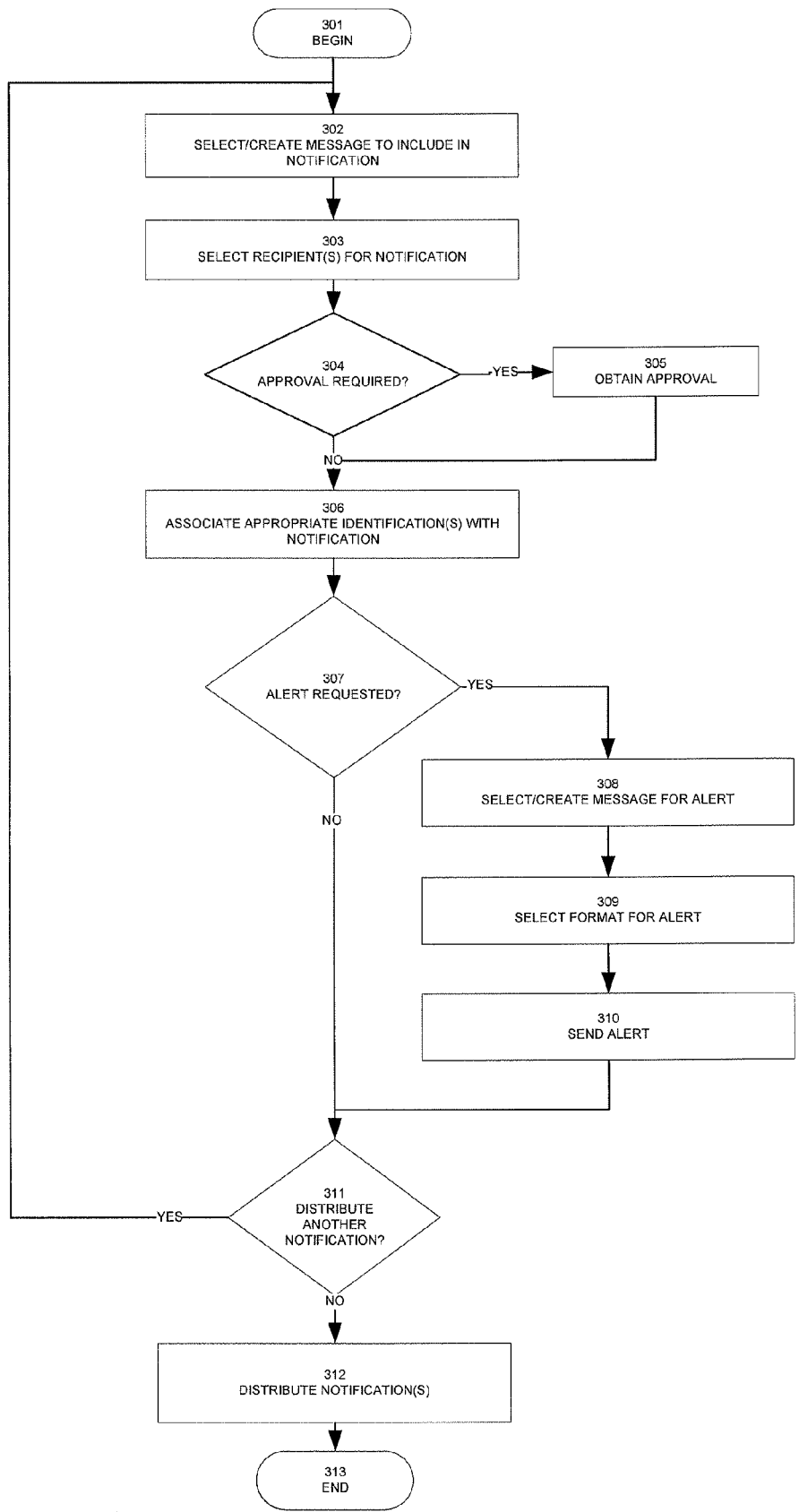
FIG. 3 is a flow chart illustrating an exemplary operation of providing identification information for notifications.

FIG. 3 is a flow chart illustrating an exemplary process of providing identification information for notifications 32.

The process proceeds from beginning step 301 to step 302 in which a message is created or selected to send. Next, in step 303, either one or multiple recipients are selected by the user 22 to receive the notification 32. If approval is required in decision step 304 for distribution of the notification, the process moves to step 305 in which approval is obtained, and the process then moves to step 306. If approval is not required in decision step 304, the process moves to step 306.

In step 306, the notification 32 is associated with the appropriate identifiers. In decision step 307, if an alert 212 associated with the notification 32 is requested or required (e.g., if the user 22 chooses to send an alert 212 or if a priority code associated with user 22 dictates that an alert 212 be automatically generated), the process moves to step 308, in which a message is created or selected for the alert 212. A format for the alert 212 is selected in step 309, and the alert associated with the notification 32 is then sent in step 310 to the distributor 70.

Returning to decision step 307, if an alert 212 associated with the notification 32 is not requested or required (e.g., if the user 22 does not choose to send an alert 212 and/or if the priority code associated with the notification 32 does not require an alert 212), the process moves to decision step 311, in which, if another notification 32 is requested to be distributed, the process returns to step 302. If, however, another notification 32 is not requested to be distributed in decision step 311, the process proceeds to step 312, in which the notifications 32 requested for distribution are distributed. The process ends in step 313.

Having set forth in FIG. 3 a process by which identification information is provided for notifications 32, an example will now be presented using the process of FIG. 3 and a school principal as an exemplary user.

The school principal (i.e., user 22) proceeds from beginning step 301 to step 302 in which she records a voice message, "School is closed tomorrow due to dangerous road conditions around the school; please avoid driving nearby," to be distributed via telephone. Next, in step 303, the school principal selects all parents or guardians of the school's students as the intended recipients for the voice notification 32. In step 304, it is determined the notification 32 requires approval, and in step 305 the notification 32 is approved by a school district officer (e.g., system administrator 30) for distribution upon that administrator's review. In step 306, the notification 32 is both manually and automatically associated with the appropriate identifiers. Specifically, the school principal may select identifiers which indicate her occupation as principal, the name of her school district as her employer, the priority code to be associated based upon the timeliness of the message, and contact information. The notification 32 is also automatically associated with both a certification that the message was approved by the school district officer for distribution, and an identifier indicating the mass notification provider 68 responsible for receiving the voice notification 32 from the school principal and for transmitting the voice notification 32 to a distributor 70 of the voice notification 32. Next, in decision step 307, the school principal may choose to send an alert 212 associated with the voice notification 32 in order to provide, to the distributor 70, advance notice and identification of the voice notification 32. Accordingly, the principal in step 308 creates an alert message, "Please call me at 555-1212 if you have any questions about this notification 32," and in step 309 chooses to send the alert in text and email format to the distributor 70, which occurs in step 310. In certain embodiments, the school principal can choose other details regarding the distribution of the alert 32, such as a scheduled time to send the alert 212 (e.g., immediately, currently in process, in two hours) or a selected representative at the distributor 70 to contact regarding the alert 212. These details may be included as identifiers or there may be a location provided (e.g., an Internet address) where the distributor 70 can obtain additional details not otherwise appended.

Next, in decision step 311, the school principal decides not to distribute another notification 32, so the process moves to step 312, in which the voice notification 32 including the message, "School is closed tomorrow due to dangerous road conditions around the school; please avoid driving nearby," is distributed via telephone to all parents or guardians of the school's students. Since the previously distributed alert 212 provided the distributor 70 responsible for distributing the voice notification 32 with identification information regarding the voice notification 32, the distributor 70 is able to distinguish the voice notification 32 when the voice notification 32 is received, such as by identifying, among the other identification information, the mass notification provider 68 who provided the voice notification 32 and the caller identification set to be associated with voice notification 32 and displayed to intended recipients. This ensures that the voice notification 32 will be distributed, and not blocked or delayed due to an assumption that notifications 32 are telemarketing or other types of calls. Accordingly, the distributor 70 thereafter distributes the voice notification 32 to the parents or guardians of the school's students. The process then ends in step 313.

With the above-described system and method, identification of mass notifications 32 to potential recipients is provided to ensure that notifications 32 are delivered appropriately. By providing identifiers to distributors 70 of the notifications 32, distributors 70 are able to distinguish notifications 32 from other network traffic and deliver the notifications 32 accordingly. Additionally, by sending alert 212, distributors 70 are able to better anticipate and manage network traffic and/or contact mass notification provider 68, system administrator 30, and/or user 22 to participate in such management as may be needed.

Figure 4:
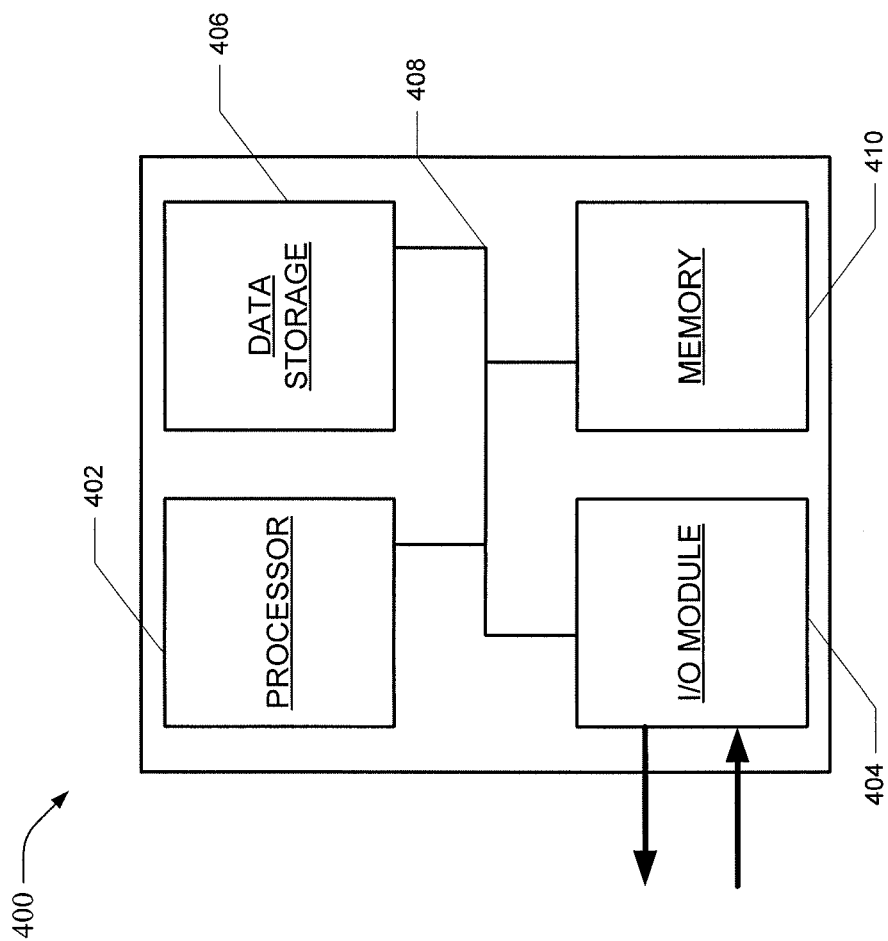
FIG. 4 is a block diagram illustrating an example of a computer system upon which identification information can be provided for notifications.

FIG. 4 is a block diagram that illustrates a computer system 400 upon which an embodiment of the present disclosure may be implemented in accordance with one aspect of the present disclosure. Computer system 400 includes a bus 408 or other communication mechanism for communicating information, and a processor 402 coupled with bus 408 for processing information. Computer system 400 also includes a memory 410, such as a random access memory ("RAM") or other dynamic storage device, coupled to bus 408 for storing information and instructions to be executed by processor 402. Memory 410 may also be used for storing temporary variable or other intermediate information during execution of instructions to be executed by processor 402. Computer system 400 further includes a data storage device 406, such as a magnetic disk or optical disk, coupled to bus 408 for storing information and instructions.

Computer system 400 may be coupled via I/O module 404 to a display device, such as a cathode ray tube ("CRT") or liquid crystal display ("LCD") for displaying information to a computer user. An input device, such as, for example, a keyboard or a mouse may also be coupled to computer system 400 via I/O module 404 for communicating information and command selections to processor 402.

According to one aspect of the present disclosure, the transmission of notifications 32 may be implemented using a computer system 400 in response to processor 402 executing one or more sequences of one or more instructions contained in memory 410. Such instructions may be read into memory 410 from another machine-readable medium, such as data storage device 406. Execution of the sequences of instructions contained in main memory 410 causes processor 402 to perform the process steps described herein. One or more processors in a multi-processing arrangement may also be employed to execute the sequences of instructions contained in memory 410. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 406. Transmission media include coaxial cables, copper wire, and fiber optics, including the wires that comprise bus 408. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for providing identification for voice notifications sent to notification recipients, comprising:
    a request module configured to receive, from a user, a request for transmitting at least one voice notification to a plurality of notification recipients;
    an identification module configured to receive at least one identifier related to the at least one voice notification;
    an associations module configured to associate the at least one voice notification with the at least one identifier; and
    a transmission module configured to transmit, from a notification provider, the at least one voice notification and the at least one identifier,
    wherein the transmission module is configured to transmit the at least one voice notification and the at least one identifier to a telecommunication provider, and wherein the at least one identifier is configured to be processed by the telecommunication provider based on the number of notification recipients in the plurality of notification recipients.

2. The system of claim 1, wherein the at least one voice notification and the at least one identifier are configured to be transmitted over a communication network, and wherein the communication network is at least one of a public switched telephone network and a time division multiplexing network.

3. The system of claim 1, wherein the at least one identifier identifies the user.

4. The system of claim 1, wherein the at least one identifier identifies the request.

5. The system of claim 1, wherein the at least one identifier identifies the notification provider.

6. The system of claim 1, wherein the at least one identifier identifies that the notification has been authenticated.

7. The system of claim 1, wherein the at least one identifier includes at least one of an Automatic Number Identifier or Presubscribed Carrier Identifier.

8. The system of claim 1, wherein the transmission module is configured to include the at least one identifier with the transmission of the at least one voice notification.

9. The system of claim 1, wherein the transmission module is configured to transmit the at least one identifier before the transmission of the at least one voice notification.

10. The system of claim 9, wherein the at least one identifier is at least one of an email notification, a telephone notification, cellular phone notification, a text message, facsimile notification, and a pager notification.

11. The system of claim 1, wherein the transmission module is configured to transmit the at least one identifier at substantially the same time as the transmission of the at least one voice notification.

12. The system of claim 1, wherein the transmission module is further configured to transmit the at least one identifier to at least one telecommunications recipient associated with the at least one telecommunications provider.

13. The system of claim 12, wherein the at least one identifier transmitted to the at least one telecommunications recipient includes at least two of an email notification, a telephone notification, cellular phone notification, a text message, facsimile notification, and a pager notification.

14. The system of claim 1, wherein the transmission module is configured to include the at least one identifier with the transmission of the at least one voice notification, and wherein the transmission module is further configured to transmit another identifier related to the at least one voice notification before the transmission of the at least one voice notification.

15. The system of claim 1, wherein the transmission module is configured to include the at least one identifier with the transmission of the at least one voice notification, and wherein the transmission module is further configured to transmit another identifier related to the at least one voice notification at substantially the same time as the transmission of the at least one voice notification.

16. A system for providing identification for voice notifications sent to notification recipients, comprising:
   a request module configured to receive, from a user, a request for transmitting at least one voice notification to a plurality of notification recipients;
   an identification module configured to receive at least one identifier configured to identify the at least one voice notification;
   an associations module configured to associate the at least one voice notification with an alert comprising the at least one identifier; and
   a transmission module configured to separately transmit the alert and the at least one voice notification to a telecommunication provider, wherein the alert is configured to be transmitted to the telecommunication provider before the at least one voice notification is transmitted to the telecommunication provider.

17. A method for providing identification for voice notifications sent to notification recipients, comprising:
   receiving, from a user, a request for transmitting at least one voice notification to a plurality of notification recipients;
   receiving at least one identifier related to the at least one voice notification;
   associating the at least one voice notification with the at least one identifier; and
   transmitting the at least one voice notification and the at least one identifier to at least one telecommunication provider,
   wherein the at least one identifier is transmitted to the at least one telecommunication provider before the transmission of the at least one voice notification to the at least one telecommunication provider.

18. The method of claim 17, wherein the at least one identifier is transmitted to at least one telecommunications recipient associated with the at least one telecommunication provider.

19. A non-transitory machine-readable medium encoded with instructions for providing identification for voice notifications sent to notification recipients, the instructions comprising code for:
   receiving, from a user, a request for transmitting at least one voice notification to a plurality of notification recipients;
   receiving at least one identifier related to the at least one voice notification;
   associating the at least one voice notification with the at least one identifier; and
   transmitting the at least one voice notification and the at least one identifier to a telecommunication provider,
   wherein the at least one identifier is transmitted to the telecommunication provider before the transmission of the at least one voice notification to the telecommunication provider.

20. A system for providing identification for voice notifications sent to notification recipients, comprising:
   a request module configured to receive, from a user, a request for transmitting at least one voice notification to a plurality of notification recipients;
   an identification module configured to receive at least one identifier related to the at least one voice notification;
   an associations module configured to associate the at least one voice notification with the at least one identifier; and
   a transmission module configured to transmit, from a notification provider to a telecommunication provider, the at least one voice notification and the at least one identifier,
   wherein the transmission module is configured to transmit the at least one identifier to the telecommunication provider before the transmission of the at least one voice notification to the telecommunication provider.

21. The system of claim 20, wherein the at least one voice notification and the at least one identifier are configured to be transmitted over a communication network, and wherein the communication network is at least one of a public switched telephone network and a time division multiplexing network.

22. The system of claim 20, wherein the at least one identifier identifies the user.

23. The system of claim 20, wherein the at least one identifier identifies the request.

24. The system of claim 20, wherein the at least one identifier identifies the notification provider.

25. The system of claim 20, wherein the at least one identifier identifies that the notification has been authenticated.

26. The system of claim 20, wherein the at least one identifier includes at least one of an Automatic Number Identifier or Presubscribed Carrier Identifier.

27. The system of claim 20, wherein the at least one identifier is configured to be processed by the telecommunication provider based on the number of notification recipients in the plurality of notification recipients.

28. The system of claim 20, wherein the at least one identifier is at least one of an email notification, a telephone notification, cellular phone notification, a text message, facsimile notification, and a pager notification.

29. The system of claim 20, wherein the transmission module is configured to transmit the at least one identifier to at least one telecommunications recipient associated with the at least one telecommunications provider.

30. The system of claim 29, wherein the at least one identifier transmitted to the at least one telecommunications recipient includes at least two of an email notification, a telephone notification, cellular phone notification, a text message, facsimile notification, and a pager notification.

31. The system of claim 20, wherein the transmission module is configured to include another identifier with the transmission of the at least one voice notification.

32. The system of claim 20, wherein the transmission module is further configured to transmit another identifier related to the at least one voice notification at substantially the same time as the transmission of the at least one voice notification.

33. A system for providing identification for voice notifications sent to notification recipients, comprising:
 a request module configured to receive, from a user, a request for transmitting at least one voice notification to a plurality of notification recipients;
 an identification module configured to receive at least one identifier related to the at least one voice notification;
 an associations module configured to associate the at least one voice notification with the at least one identifier; and
 a transmission module configured to transmit, from a notification provider to a telecommunication provider, the at least one voice notification and the at least one identifier, wherein the transmission module is configured to include the at least one identifier with the transmission of the at least one voice notification, and wherein the transmission module is further configured to transmit another identifier related to the at least one voice notification to the telecommunication provider before the transmission of the at least one voice notification to the telecommunication provider.

34. The system of claim 33, wherein the at least one voice notification and the at least one identifier are configured to be transmitted over a communication network, and wherein the communication network is at least one of a public switched telephone network and a time division multiplexing network.

35. The system of claim 33 wherein the at least one identifier identifies the user.

36. The system of claim 33, wherein the at least one identifier identifies the request.

37. The system of claim 33, wherein the at least one identifier identifies the notification provider.

38. The system of claim 33, wherein the at least one identifier identifies that the notification has been authenticated.

39. The system of claim 33, wherein the at least one identifier includes at least one of an Automatic Number Identifier or Presubscribed Carrier Identifier.

40. The system of claim 33, wherein the at least one identifier is configured to be processed by the telecommunication provider based on the number of notification recipients in the plurality of notification recipients.

41. The system of claim 33, wherein the at least one identifier is at least one of an email notification, a telephone notification, cellular phone notification, a text message, facsimile notification, and a pager notification.

\* \* \* \* \*